3,196,117
INTERMOLECULAR ALKYD-EPOXY COMPLEXES
Robert A. Boller, Richfield, Minn., assignor to Archer-Daniels-Midland Company, Minneapolis, Minn., a corporation of Delaware
No Drawing. Filed June 19, 1958, Ser. No. 743,026
18 Claims. (Cl. 260—22)

This invention relates to intermolecular alkyd-epoxy complexes derived from alkyd materials and epoxidized derivatives of unsaturated compounds, compositions formed therewith and mixtures thereof with materials, including the methods of preparing the same. More particularly the invention relates to infinitely water dilutable (apparently water soluble) film forming and plastic epoxy resinous complexes, as an intermolecular arrangement of a modified alkyd resinous material and an epoxidized fatty acid derived compound, such as epoxidized linseed oil or other epoxidized fatty oil derived material, the method of preparing the same in a water soluble system and products obtained therewith.

The products of this invention are preferably utilized as vehicles in coating compositions and are capable of being thinned with water and of forming improved varnish, paint and enamel compositions. The preferred compositions cure to films having excellent adhesion, internal cohesion (as evidenced by flexibility) to toughness, with high gloss and superior water, alkali and chemical resistance, and are substantially non-yellowing or have no discoloration characteristics upon excessive aging.

The non-flammable vehicle products of this invention have particular usefulness where coatings are factory-applied and where the use of conventional coating compositions produces fire risks and ordinances require disposal of objectional vapors. For best results the products of this invention are baked to cure the finished films but the use of the baking technique is not mandatory in all instances.

Various procedures have heretofore been suggested for imparting water solubility (or dispersibility) to coating and the like compositions utilizing resinous materials and other normally water-insoluble compounds as their underlying ingredients. These prior art procedures have not been significantly successful, for whilst in some such compositions there is achieved some water solubility, these have lacked desired attributes such as alkali resistance, whereas others produce weakened films of impaired gloss. Still others are merely dispersions, and not truly infinitely water-soluble, and have poor gloss, poor color retention, poor resistance to the freeze-thaw cycle, and only fair water and alkali resistance.

It is an object of the invention to provide improved coating composition constituents and coating compositions which seem to be water-soluble and hence infinitely dilutable with water, the said compositions and constituents being capable of use without fire hazard, and which produce tough, durable flexible films of excellent resistance to water, alkalies, acids, excellent toughness and resistance to weathering, abrasion and repeated freeze-thaw cycles, and having excellent resistance to yellowing and excellent color retention when pigmented, processes of making such coating composition constituents and coating composition.

It is another object of this invention to provide stable, water-soluble, oil base epoxy complex resinous compositions, containing a reactive epoxy group, and capable of being thinned with water for application as a film and then dried and cured into water insoluble films.

It is another object of this invention to provide improved water soluble varnish, paint and enamel vehicles comprising water soluble half-esters of film forming resinous materials and long chain epoxy compounds derived from fatty oils, which vehicles are capable of being cured by baking to give finishes with high gloss, excellent water, alkali and chemical resistance including improved adhesion, flexibility, toughness and color retention.

An additional object of this invention is to provide a process for obtaining stable water soluble film forming alkyd resin epoxy compounds containing modified resin vehicles for varnishes, paints and enamels including compounding with pigments.

A further object of this invention is to provide water-soluble stable, white pigmented complex containing fatty epoxy compounds in association with resinous materials, capable of being baked to produce the finished films.

It is still another object of the invention to provide improved water soluble, fatty acid modified resinous material wherein residual acidity, derived as a half-ester of a diabasic acid or anhydride thereof in a partially reacted condition, is blocked temporarily, but is available for final reaction, all in a water system, and is reactively associated with an oil base epoxy material, said material containing a water soluble organic inhibitor which retards the reaction until inactivated or driven off by heating the composition upon final application as a film, which composition, in the form of a cured film, is non-yellowing, upon excessive aging, flexible, tough and has improved adherence to metal, glass and other surfaces.

To the accomplishment of the foregoing and related ends, this invention then comprises the features hereinafter more fully described and inherent therein, and as particularly pointed out in the claims, the following description setting forth in detail certain illustrative embodiments of the invention and improvement, these being indicative, however, of but a few of the various ways in which the principle of the invention may be employed.

For producing inter molecular complexes of the herein described fatty acid modified alkyd resin material and epoxidized compounds containing internal oxirane oxygen and as coating compositions of the present invention, the processing involves two procedural parts as follows:

*Part 1.*—In this part of the processing there is formed an oil-modified alkyd resin containing a mono-basic acid, a poly-basic acid or anhydride, and a polyol in which a second polybasic anhydride is reacted with the previously reacted mono-basic acid-poly-basic acid-polyol complex so as to produce oil-modified resinous half ester material. These complexes are all of high acid No. of about 80 to 120, after the final reaction, with retention of a carboxyl group or groups which are reactive with epoxy groups.

*Part 2.*—In the second part of the processing the oil-modified resinous-half ester complex material, after cooling and after being diluted with a water-miscible mutual solvent, is reacted with a long chain fatty compound having internal oxirane oxygen. This part of the reaction is not carried to completion, but is stopped by the addition of a neutralizing inhibitor and stabilizer, such as ammonia or an amine, preferably an alkyl amine, wherein the alkyl radical contains 1 to 5 carbon atoms, for example triethyl amine. Further, in this part of the reaction, care is taken to guard against allowing the reaction between the complex of Part 1 and the epoxidized compound to go to completion, and to this end, the expoxidized compound and the inhibitor-neutralizer may be added step-wise in desired proportions on adequate stirring and cooling, because the reaction is exothermic. Periodic determination of the acid number of the reaction mass and clarity determinations of the samples (when fully neutralized and diluted with water), all as elsewhere exemplified herein, afford adequate control. In this Part 2 reaction the temperature should not be permitted to exceed about 200° F. and should preferably be kept from about 125° F. to 145° F. for the preferred reactants, as herein exemplified.

The resultant finished reaction product, of Parts 1 and 2, is an intermolecular complex of epoxidized long chain fatty compound and oil-modified alkyd resin type half ester material existing as an amine neutralized product of partially reacted alkyd half ester with a residual acid value of about 40 to about 120 and long chain epoxidized fatty material contained in water and a water miscible organic solvent. In the final products, the viscosity normally depends upon the proportion of liquid to solids. The preferred resultant viscosity is in the range of about 10 to about 30 stokes at about a 46% NV (non-volatile). The pH range is about 7.2 to about 9 and the Gardner color is about 1 to about 4.

The aforesaid resultant products can also be utilized as heat reactive molding resins, laminating and bonding agents and the like with or without modification and additional thinning, if necessary. As a principal use, the products are utilized as paint or enamel vehicles which can be thinned by the addition of water before or after pigments are ground directly thereinto, and with or without the subsequent addition of more water, for thinning, if desired or necessary for application as a film. Films formed from the preferred water-soluble vehicles can be cured at temperatures varying from 150–300° F. in 10–60 minutes or more. At lower temperatures, longer curing times are required. The preferred baking schedule is 30 minutes at 250° F. to 300° F. As hereinafter described, tough, high gloss films with excellent chemical resistance are obtained. Additional and other resinous and compatible components may be incorporated as hereinafter exemplified.

The residual reactive nuclei of the complex remains blocked by the inhibitor-neutralizer, during storage and even in the completed paint or enamel. However, upon application as a film, and upon heating, the inhibitor-neutralizer is driven off and a final reaction takes place in situ, in the film. This reaction involves inter-reaction between nuclei of the alkyd-half ester and the epoxy compound, with resultant formation of the desired film having the aforesaid characteristics. This all takes place without fire hazard.

As illustrated, the base resin is a modified alkyd. For non-yellowing characteristics the modification is with saturated fatty acids.

The following examples illustrate further the manner in which the products of this invention are prepared, but it is to be understood that these examples are merely illustrative, and are not limitations on the invention.

EXAMPLE I

Part 1

| | Parts by weight |
|---|---|
| (A) Pelargonic acid | 210 |
| (B) Monopentaerythritol | 224 |
| (C) Phthalic anhydride | 285 |
| (D) Maleic anhydride (optional) | 1 |
| (E) Diethylene glycol diethyl ether (optional) | 63 |
| (F) Tetrachlorophthalic anhydride | 188 |
| (G) Ethylene glycol monobutyl ether | 312 |
| | 1,283 |

Vis. _____ 80 stokes.
NV _____ 69%.
A.V. _____ 94 (on NV).

Part 2

Base alkyd ester of Part 1 _____ 250
(A) Triethylamine _____ 223.5
(B) Epoxidized linseed oil (8.5% oxirane oxygen) _____ 68.8
(C) Water _____ 181.7

524.0

Vis. _____ stokes__ 17.3
NV _____ percent__ 46
pH _____ 8.33
Gardner color _____ 2–3

EXAMPLE II

Part 1

| | Parts by weight |
|---|---|
| (A) Coconut fatty acids | 190 |
| (B) Monopentaerythritol | 200 |
| (C) Phthalic anhydride | 285 |
| (D) Maleic anhydride (optional) | 1 |
| (E) Diethylene glycol diethyl ether (optional) | 63 |
| (F) Tetrachlorophthalic anhydride | 188 |
| (G) Ethylene glycol monobutyl ether | 315 |
| | 1,242 |

Vis. _____ 75 stokes.
NV _____ 68%.
A.V. _____ 104 (on NV).

Part 2

Base alkyd ester of Part 1 _____ 250
(A) Triethylamine _____ 24.8
(B) Epoxidized linseed oil (8.5% oxirane oxygen) _____ 60
(C) Water _____ 166.5

501.3

Vis. _____ stokes__ 21
NV _____ percent__ 46.5
pH _____ 8.5
Gardner color _____ 3

In each of the above examples, the components (A), (B), (C), (D), and (E), for Part 1 formulation, were mixed and reacted in a manner of forming the alkyd ester by a conventional alkyd esterification process. The process consisted essentially of conventionally mixing and heating compounds (A) to (E) to 350°–400° F. until the desired acid value was obtained. The acid value determinations were made, by a conventional Gardner test method, on samples of the reaction products at given intervals. The maleic anhydride is preferably used, but may be eliminated, if desired. Less preferably other alpha-beta unsaturated mono- and dibasic acid compounds may be substituted in its stead. An inert water miscible solvent as the ether (E) is preferably utilized. However, in some instances, the solvent may be eliminated or another unreactive solvent substituted therefor.

After the acid value had been reduced to the approximate level of about 70 to about 90, as determined by a conventional test method, the reaction mixture was cooled to 275° F. or less and the tetrachlorophthalic anhydride (F) added. The temperature was again raised to 350°–375° F. and held for about 15 to 30 minutes to form a partial or half-ester of the prepared alkyd material and the tetrachlorophthalic acid, with retention of residual acidity at least equivalent to one carboxy group. After formation of the half-ester, the fatty oil modified alkyd resin was cooled to about 250° F. or less, the water miscible solvent (G) added, with agitation, and further cooled to under about 130° F.

The components of Part 2 were then added to the tetrachlorophthalic half-ester of Part 1, preferably as follows: first, about a ⅓ portion of the inhibitor and stabilizer, triethylamine (A) was added and mixed therein to condition the half-ester to the addition of the epoxy component (B) which was then added. Alternately, the inhibitor, in an approximate proportion, as indicated, may first be mixed with the epoxy compound and this mixture then added to the reaction product of the Part 1, with agitation.

The addition of the epoxy component (B) causes an exothermic reaction temperature rise which was maintained at between about 140° to about 145° F. for a sufficient period of reaction time to reduce the acid value about 6 to 12 points, but in the above, preferably about 8 to about 10 points, as was approximately determined by a method of conventionally measuring samples from time to time. Another method of measurement, for determining clarity and reaction endpoint is as follows:

Approximately 50 g. of the complex of known non-volatile content and acid value are removed. This contains a portion of the amine inhibitor stabilizer. The acidity is further neutralized to a pH of 7.8 with an additional amount of the same amine. The amine neutralized sample is reduced to 15% non-volatile with water. Excess opacity of this solution indicates that further reaction is necessary. If the opacity of the 15% solution is such that newsprint can be read through a depth of about 1½ inches the preparation reaction is considered essentially complete.

At the point of desired clarity, indicated by the test sample, the balance of the amine was added to stop the reaction. Thereafter, the vehicle was diluted with water (C) about five to ten minutes after the last addition of amine.

It was found that the alkyd resin-epoxy complexes of Examples I and II could be utilized immediately, or stored for future use. As a paint and enamel vehicle, pigments were readily ground thereinto, in conventional paint grinding equipment. The pigmented material was stored for long and indefinite periods without harm to coating properties.

As indicated, the preferred utilization of the above water thinned alkyd resin-epoxy complexes is a varnish, paint and enamel vehicle material into which a pigment or dye material is more readily incorporated, in the manner as with respect to Example XVIII. The above water soluble alkyd resin-epoxy complexes, when properly heat cured were found to be essentially colorless, or water-white and to have better than expected non-yellowing properties when over-heated. This property makes these vehicles useful for enamels used on refrigerators, washing machines, stoves, sanitary equipment and the like.

Additional water soluble alkyd resin-epoxy complexes are illustrated, as follows:

EXAMPLE III

Part 1

Components:                                              Parts by weight
    (A) Tall oil fatty acid (low rosin content) ____ 105
    (B) Monopentaerythritol _____ 80
    (C) Phthalic anhydride _____ 110
    (D) Maleic anhydride _____ 1.6
    (E) Diethylene glycol diethylether _____ 24
    (F) Tetrachlorophthalic anhydride _____ 72
    (G) Ethylene glycol monobutylether _____ 128

The components (A), (B), (C), (D), and (E) were mixed and reacted at 360°–400° F. by a conventional alkyd esterification procedure until the acid value was reduced to 70–75, as determined from samples of the reaction mixture and measured by a conventional process. In this reaction, the diethylene glycol diethyl ether served as a non-reactive water miscible solvent. However, this or a like solvent, aids in the removal of the water of reaction and prevents vapor loss of phthalic anyhydride. (Water and diethylene glycol diethyl ether are immiscible at 150°–200° F., water forming the bottom layer.) Further, the maleic anhydride is preferably included, as it obtains better color retention and provides improvement in the resin. In this and other examples, the maleic anyhydride, or other alpha-beta ethylenic mono- and di- basic acid compounds may or may not be used, as desired.

After the acid number was reduced to 70–75, the reaction mixture was cooled to 275° F. or less and the tetrachlorophthalic anhydride (F) added. The temperature was then raised to 350°–375° and held from about 20 to about 30 minutes with formation of the half ester by reaction of the tetrachlorophthalic with the alkyd-ester. This addition of the component (F), as illustrated, towards the end of the reaction period, forms the half-ester so that the acidity is at least equivalent to one carboxy group in the tetrachlorophthalic ingredient. After formation of the half-ester, the modified alkyd resinous material was cooled to 250° F. or less and the water miscible solvent ethylene glycol monobutylether (G) added with agitation. After addition of the solvent (G), the infinitely dilutable or water soluble oil based epoxy resin complex was prepared by controlled addition of the following components forming an addition to the reaction product of Part 1 of the mixture, viz., Part 2

Parts by weight
    (A) Epoxidized linseed oil (8.3% oxirane) _____ 73
    (B) Triethylamine _____ 62
    (C) Water (tap) _____ 320

This addition was accomplished as follows:

When the half-ester of Part 1 was cooled down to about 100° to about 130° F., the epoxidized linseed oil (A) was added with a portion of the amine (B), to slow the reaction. Preferably the acidity of the mixture is reduced by the addition of a small portion e.g. about ¼ of the amine neutralizer and stabilizing agent just before the addition of the epoxidized oil. While in some instances the epoxidized oil may be added first, before addition of any amine, it is preferred to reduce the rate of reaction and maintain a better control of the acid value. The retained acidity of the modified alkyd base allowed for an initial reaction between the epoxidized oil and the halfester composition. The reaction was accompanied by an exothermic temperature rise that was maintained at between 140° F. to 145° F. for a sufficient time to reduce the acid value approximately 6 to 12 points and preferably about 8 to about 10 points, as approximately determined by taking samples and determining by conventional measurement. This reaction should be carried out slowly at a moderate temperature level of about 140°–145° F. to obtain a resultant high gloss film in the final product. As will be recognized after becoming familiar with these conditions relative to time and temperature with respect to the various reactants, a close approximation can be determined when samples of the reaction mixture are neutralized with the amine (B) and diluted with water to a low solids (5–10% NV) to determine clarity. As soon as the diluted test solution becomes clear the reaction is stopped by adding the balance of the amine. The water (C) was added about 5–10 minutes after the amine had completely neutralized the residual acidity of the alkyd. This interval is preferred as it appears to aid in maintaining solution clarity, where desirable.

EXAMPLE IV

Part 1

Components:                                              Parts by weight
    (A) Soybean fatty acids _____ 406
    (B) Pentaerythritol _____ 425
    (C) Phthalic anhydride _____ 425
    (D) Maleic anhydride _____ 4
    (E) Diethylene glycol diethyl ether _____ 94
    (F) Tetrachlorophthalic anhydride _____ 281
    (G) Ethylene glycol monobutyl ether _____ 500

The components (A), (B), (C), (D), and (E) were reacted in a reaction vessel equipped with agitator, thermometer, source of heating and cooling, reflux condenser, with a water trap and inert gas supply. The mixture was heated to about 350°–380° F. with agitation to obtain esterification and an inert gas, as nitrogen, bubbled through the reactants for removal of water. When the acid value reached about 72–77, the reaction mixture was cooled to about 260° F. and component (F) added. The temperature was then raised to 350°–380° F. for about one-half hour to effect half-ester formation by reaction of the alkyd and the added tetrachlorophthalic anhydride. The half-ester alkyd base material was then cooled to below 250° F. and the component (G) added. Agitation and cooling were continued until the temperature was reduced to 120° F. or lower, at which point the modified alkyd was found to have an acid value of about 89, vis. 80 stokes, NV 70.5%, and Gardner standards color 4–5.

The modified alkyd base prepared in Part 1 is then ready for production of the water soluble epoxy resin complex formed in Part 2, which involves partial reaction of an epoxidized oil with the reaction product of Part 1, as follows:

Part 2

| | Parts by weight |
|---|---|
| (A) Base alkyd ester of Part 1 | 345 |
| (B) Triethylamine | 32.5 |
| (C) Epoxidized linseed oil (8.3% oxirane) | 50 |
| (D) Water | 204 |

The component (A) was charged to a reaction vessel equipped with agitator, thermometer, source of heating and cooling, and a reflux condenser and heated, with agitation, to about 135° F. and about 9 parts (B) added. An exothermic reaction raised the temperature to about 150° F. and about 10 minutes after adding the (B) portion, (C) was added and the mixture held at 145° F. for 30 minutes. Thereafter the reaction mixture was cooled and the balance of (B) added. After 5 to 10 minutes mixing (D) was added and agitation continued until the mixture cooled to room temperature.

| | | |
|---|---|---|
| Vis. | stokes | 10.3 |
| NV | percent | 47 |
| pH | | 8.4 |
| Gardner color | | 5 |

This water soluble epoxy complex is preferably pigmented but may be utilized, as a heat cured clear body and finish. Otherwise, if desired, as other like complexes, the composition is applicable in the plastic heat molding art, or as water soluble adhesive material in the laminating and other arts, in each of which cases it is cured to a water insoluble state by heat.

The following are additional examples illustrating various reaction components applicable in formulating water soluble epoxy resin complexes of half-ester alkyd and epoxidized oil base compositions. These and other described epoxy complexes also provide components for plastics, adhesives and other compositions including varnish or paint and enamel vehicles as herein described:

EXAMPLE V

Part 1

| | Parts by weight |
|---|---|
| (A) Linseed fatty acids | 330 |
| (B) Glycerol | 280 |
| (C) Phthalic anhydride | 425 |
| (D) Maleic anhydride | 5 |
| (E) Diethylene glycol diethyl ether | 97 |
| (F) Tetrachlorophthalic anhydride | 280 |
| (G) Ethylene glycol monoethyl ether | 460 |

| | | |
|---|---|---|
| Vis. | | 125 stokes. |
| NV | | 70%. |
| A.V. | | 91 (on NV). |

Part 2

| | Parts by weight |
|---|---|
| (A) Base alkyd resin, Part 1 | 345 |
| (B) Triethylamine | 33 |
| (C) Epoxidized linseed oil (oxirane 8.3%) | 72.5 |
| (D) Water | 228 |

| | | |
|---|---|---|
| Vis. | stokes | 25 |
| NV | percent | 47 |
| pH | | 8.2 |
| Gardner color | | 4 |

EXAMPLE VI

Part 1

| | Parts by weight |
|---|---|
| (A) Tall oil fatty acids | 367 |
| (B) Trimethylolethane | 162 |
| (C) Sorbitol | 140 |
| (D) Phthalic anhydride | 425 |
| (E) Maleic anhydride | 4 |
| (F) Diethylene glycol diethyl ether | 94 |
| (G) Tetrachlorophthalic anhydride | 280 |
| (H) Ethylene glycol monobutyl ether | 480 |

| | |
|---|---|
| Vis. | 100 stokes. |
| NV | 69.2 percent. |
| A.V. | 87 (on NV). |

Part 2

| | Parts by weight |
|---|---|
| (A) Base alkyd resin, Part 1 | 345 |
| (B) Dimethylethanolamine | 31 |
| (C) Epoxidized soybean oil (oxirane 6.2%) | 67.5 |
| (D) Water | 228.7 |

| | | |
|---|---|---|
| Vis. | stokes | 22 |
| NV | percent | 46 |
| pH | | 8.0 |
| Gardner color | | 3+ |

EXAMPLE VII

Part 1

| | Parts by weight |
|---|---|
| (A) Soybean fatty acids | 120 |
| (B) Mono-pentaerythritol | 58 |
| (C) Tetrachlorophthalic anhydride | 170 |
| (D) Ethylene glycol monobutyl ether | 45 |

| | |
|---|---|
| Vis. | 22 stokes. |
| NV | 77.5%. |
| A.V. | 88.7 (on NV). |

Part 2

| | Parts by weight |
|---|---|
| (A) Base alkyd resin, Part 1 | 312 |
| (B) Dimethylethanolamine | 31 |
| (C) Epoxidized soybean oil (oxirane 6.2%) | 70 |
| (D) Water | 267 |

| | | |
|---|---|---|
| Vis. | stokes | 10 |
| NV | percent | 46 |
| pH | | 8.5 |
| Gardner color | | 6 |

EXAMPLE VIII

Part 1

| | Parts by weight |
|---|---|
| (A) Dehydrated castor oil fatty acids | 365 |
| (B) Mono-pentaerythritol | 310 |
| (C) Phthalic anhydride | 485 |
| (D) Maleic anhydride | 3 |
| (E) Diethylene glycol diethyl ether | 94 |
| (F) Tetrachlorophthalic anhydride | 165 |
| (G) Ethylene glycol monobutyl ether | 490 |

| | |
|---|---|
| Vis. | 215 stokes. |
| NV | 69%. |
| A.V. | 89.8 (on NV). |

Part 2

| | Parts by weight |
|---|---|
| (A) Base alkyd resin, Part 1 | 250 |
| (B) Triethylamine | 24 |

Part 2—Continued

| | Parts by weight |
|---|---|
| (C) Epoxidized linseed oil (oxirane 8.3%) | 36 |
| (D) Water | 143 |

| | | |
|---|---|---|
| Vis. | stokes | 18 |
| NV | percent | 46.5 |
| pH | | 7.4 |
| Gardner color | | 3+ |

The procedure of formulation of each water soluble half-ester alkyd resin and the reaction addition of an epoxidized fatty oil material therewith is the same as that described for Example III above, with the exception of Part 1, Example VII.

In Part 1 of Example VII there is illustrated an alternative batch process of adding an excess of the tetrachlorophthalic anhydride in lieu of phthalic anhydride. This eliminates the cooling step in the preferred procedure before addition of the dibasic anhydride material. The conditions and temperature of reaction are similar except that the reaction time is reduced by about 1 hour. However, with the excess of tetrachlorophthalic anhydride used there will be both diester and half ester formation, the viscosity control is more uncertain and the compositions are found to be more unstable and subject to gelation upon reaction without a great deal of care to prevent overheating. In general it may be indicated that the preferred process of this invention is to utilize the procedures indicated for Part 1 of Examples I to IV.

Example IX

PART 1

An alcoholysis product of alkali refined soybean oil was first prepared by mixing 226 parts of soybean oil with 54 parts monopentaerythritol and 0.10 part by weight lithium hydroxide and heating the mixture for one-half hour at 450° F. To the above product were added the following components:

Part 1

| | Parts by weight |
|---|---|
| (A) Phthalic anhydride | 285 |
| (B) Monopentaerythritol | 112 |
| (C) Maleic anhydride | 1.5 |
| (D) Diethylene glycol diethyl ether | 63 |
| (E) Tetrachlorophthalic anhydride | 188 |
| (F) Ethylene glycol monobutyl ether | 300 |

The above reaction product was formulated in the manner as described with respect to Examples I through III. Essentially, this comprises first treating the soybean oil alcoholysis product with components (A), (B), (C), and (D), as in an alkyd production, as described, after which was added the component (E), the mixture heated to 350° F. to 370° F. and the reaction taken to an acid value of approximately 86. The reaction mixture was then cooled to about 250° F. and the portion (F) added. This composition had the following constants:

| | |
|---|---|
| Vis. | 83 stokes. |
| NV | 69.3%. |
| Gardner color | 5+. |
| A.V. | 102 (on NV). |

Part 2

| | Parts by weight |
|---|---|
| (A) Base alkyd resin, Part 1 | 250 |
| (B) Triethylamine | 25 |
| (C) Epoxidized linseed oil (8.3%) | 60.7 |
| (D) Water | 173.3 |

The processing of Part 2 was in the same manner as heretofore described, essentially ½ hour at 145° F. and produced a water soluble resin complex of an epoxidized long fatty chain compound derived from an oil or oil base substance. The final product had the following constants:

| | |
|---|---|
| Vis. | 7.5 stokes. |
| pH | 7.6 and infinitely water soluble. |

EXAMPLE X

Part 1

| | Parts by weight |
|---|---|
| (A) Tall oil fatty acids | 130 |
| (B) Monopentaerythritol | 100 |
| (C) Phthalic anhydride | 135 |
| (D) Maleic anhydride | 2 |
| (E) Diethylene glycol diethyl ether | 30 |
| (F) Chlorendic anhydride | 115 |
| (G) Ethylene glycol mono- butyl ether | 124 |

| | |
|---|---|
| Vis. | 240 stokes. |
| NV | 76%. |
| A.V. | 91.2 (on NV). |
| Gardner color | 3–4. |

Part 2

| | Parts by weight |
|---|---|
| (A) Base alkyd resin, Part 1 | 230 |
| (B) Triethylamine | 24 |
| (C) Epoxidized linseed oil (8.3% oxirane value) | 61 |
| (D) Water | 200 |

| | | |
|---|---|---|
| Vis. | stokes | 14 |
| NV | percent | 46 |
| pH | | 7.8 |

The above was prepared in the manner heretofore described and is an additional illustration of the water soluble epoxy oil based resinous complex herein described.

Further examples, illustrative of modification are shown, as follows:

EXAMPLE XI

Part 1

| | Parts by weight |
|---|---|
| (A) Tall oil fatty acids | 112 |
| (B) Monopentaerythritol | 102 |
| (C) Phthalic anhydride | 143 |
| (D) Maleic anhydride | 1 |
| (E) Diethyl ethylene glycol diethylether | 30 |
| (F) Monochlorophthalic anhydride | 65 |
| (G) Ethylene glycol mono- butyl ether | 150 |

(A), (B), (C), (D) and (E) were reacted in a conventional manner, as described, to acid value of 75, cooled and at 275° F. (F) was added. The mixture was reheated to 350–370° F. for 30 minutes, cooled to 200° F. and (G) was added. The resulting product analyzed:

| | |
|---|---|
| Vis. | 190 stokes. |
| NV | 68.5%. |
| A.V. | 105 (on NV). |

Part 2

| | Parts by weight |
|---|---|
| (A) Base alkyd resin, Part 1 | 200 |
| (B) Triethylamine | 5 |
| (C) Epoxidized linseed oil (8.3% oxirane value) | 49 |
| (D) Triethylamine | 17 |
| (E) Water | 137 |

Components (A), (B), (C) were reacted as described and held at 125° F. for 1½ hours then (D) was added with cooling. After 5–10 minutes, (E) was added with good agitation. The product analyzed:

| | | |
|---|---|---|
| Vis. | stokes | 9.9 |
| pH | | 7.3 |
| Gardner color | | 2–3 |

EXAMPLE XII

Part 1

| | Parts by weight |
|---|---|
| (A) Pelargonic acid | 190 |
| (B) Monopentaerythritol | 220 |
| (C) Phthalic anhydride | 285 |
| (D) Maleic anhydride | 1 |
| (E) Diethylene glycol diethyl ether | 63 |

Part 1—Continued

| | Parts by weight |
|---|---|
| (F) Tetrachlorophthalic anhydride | 188 |
| (G) Ethylene glycol mono- butyl ether | 285 |

A thru E were reacted in a conventional manner as described at 350–390° F. to acid value of 80, cooled to 275° F. and (F) added. The mixture was reheated to 350–370° F. for ½ hour, cooled to 200° F. and (G) added. The product analyzed:

| | |
|---|---|
| Vis. | 117 stokes. |
| Gardner color | 1–2. |
| A.V. | 103 (on NV). |
| NV | 68.8%. |

Other inhibitors, of a less preferred character for some compositions, may otherwise be utilized in formulating water soluble alkyd epoxy resin materials.

The following are non-limiting variations illustrating the utilization of ammonia and different amines as stabilizing agents:

Part 2a

| | Parts by weight |
|---|---|
| (A) Base alkyd resin, Part 1 | 250 |
| (B) 28% aqueous ammonia | 3.9 |
| (C) Epoxidized linseed oil (8.3% oxirane) | 70 |
| (D) 28% aqueous ammonia | 11 |
| (E) Water | 197 |

Components (A), (B), (C) were reacted as described and held at 125° F. for one hour. Then (D) was added with cooling. After 10 minutes (E) was added with good agitation. The product analyzed:

| | | |
|---|---|---|
| Vis. | stokes | 28 |
| pH | | 7.75 |
| Gardner color | | 2+ |

Part 2b

| | Parts by weight |
|---|---|
| (A) Part 1 resin | 250 |
| (B) N-methyl morpholine | 6.5 |
| (C) Epoxidized linseed oil (8.0% oxirane) | 70 |
| (D) N-methyl morpholine | 18.4 |
| (E) Water | 187.6 |

Components (A), (B) and (C) were reacted at 125° F. for one hour, then (D) was added with cooling. After 10 minutes (E) was added with good agitation. The product analyzed:

| | | |
|---|---|---|
| Vis. | stokes | 14 |
| pH | | 6.5 |
| Gardner color | | 2 |

Part 2c

| | Parts by weight |
|---|---|
| (A) Part 1 resin | 250 |
| (B) Diethylethanol amine | 7.5 |
| (C) Epoxidized linseed oil (8.5% oxirane) | 70 |
| (D) Diethylethanol amine | 21.3 |
| (E) Water | 183.6 |

The procedure was the same as in Part 2b. The product analyzed:

| | | |
|---|---|---|
| Vis. | stokes | 13 |
| pH | | 7.7 |
| Gardner color | | 2 |

Part 2d

| | Parts by weight |
|---|---|
| (A) Part 1 resin | 250 |
| (B) Dimethylethanol amine | 8 |
| (C) Epoxidized linseed oil (8.3% oxirane) | 70 |
| (D) Dimethylethanol amine | 23 |
| (E) Water | 181 |

The procedure was the same as in Part 2b. The product analyzed:

| | | |
|---|---|---|
| Vis. | stokes | 13 |
| pH | | 8.2 |
| Gardner color | | 2+ |

EXAMPLE XIII

Part 1

| | Parts by weight |
|---|---|
| (A) Tall oil fatty acids | 335 |
| (B) Mono- pentaerythritol | 209 |
| (C) Phthalic anhydride | 268 |
| (D) Maleic anhydride | 4 |
| (E) Diethylene glycol diethyl ether | 63 |
| (F) Tetrachlorophthalic anhydride | 181 |
| (G) Ethylene glycol mono- butyl ether | 350 |

The above were reacted by the procedure indicated in Example I.

| | |
|---|---|
| Vis. | 34 stokes. |
| NV | 69.5%. |
| A.V. | 78.5 (on NV). |
| Gardner color | 3–4. |

Part 2

| | Parts by weight |
|---|---|
| (A) Base modified alkyd resin, Part 1 | 300 |
| (B) Triethyl amine | 25 |
| (C) Epoxidized linseed oil (8.5% oxirane) | 44 |
| (D) Water | 183 |

Component (A) and 6 parts of component (B) were reacted for 5 minutes at 110° F. and by exothermic and additional heat the temperature was increased to 145° F. at which point all of component (C) was added. The mixture was held at 145° F. for 45 minutes, followed by the addition of the remaining 19 parts of (B). After 10 minutes the reaction was completed and all of (D) was added.

| | | |
|---|---|---|
| Vis. | stokes | 13 |
| NV | percent | 46 |
| pH | | 8.8 |

Further examples illustrating different components and compositions, as defined herein, are embodied in the following compositions.

EXAMPLE XIV

Part 2

| | Parts by weight |
|---|---|
| (A) Pelargonic acid | 190 |
| (B) Monopentaerythritol | 165 |
| (C) Ethylene glycol | 50 |
| (D) Tetrahydrophthalic anhydride | 290 |
| (E) Maleic anhydride | 1 |
| (F) Diethyl ether of diethylene glycol | 63 |
| (G) Tetrachlorophthalic anhydride | 188 |
| (H) Monobutyl ether of ethylene glycol | 295 |

This preparation is made in the manner as described for Example I and generally comprises a conventional alkyd esterification process for the components (A) through (F), esterified at 360–400° F. to an acid number of 75. The alkyd is then cooled to 275° F., (G) added and the mixture heated to 370° F. to form the alkyd half ester composition which is cooled to 200° F. with the addition of the ether (H). The product analyzed:

| | |
|---|---|
| NV | 69.7%. |
| Vis. | 26.5 stokes. |
| Gardner color | 1–2. |
| A.V. | 88 (on NV). |

Part 2

| | Parts by weight |
|---|---|
| (A) Part 1 product | 250 |
| (B) Epoxidized linseed oil (8.3% oxirane) | 61 |
| (C) Triethylamine | 21.7 |
| (D) Water | 178.3 |

The Part 2 reaction product was prepared in the manner as heretofore indicated and generally comprises charging component (A) and 25% of component (C) to a reactor, heat to 125° F., after which (B) was added and held at 125° F. for one hour. The remainder of (C) was then added and after ten minutes the water (D) was added with full mixing and cooling. The product analyzed:

NV _____ percent__ 46
Vis. _____ stokes__ 5.2
pH _____ 7.5
Gardner color _____ 2—

EXAMPLE XV

Part 1

| | Parts by weight |
|---|---|
| (A) Tall oil fatty acids (low rosin) | 270 |
| (B) Monopentaerythritol | 210 |
| (C) Tetrahydrophthalic anhydride | 290 |
| (D) Maleic anhydride | 1.5 |
| (E) Diethyl ether of diethylene glycol | 64 |
| (F) Tetrachlorophthalic anhydride | 188 |
| (G) Monobutylether of ethylene glycol | 340 |

A modified alkyd ester product was prepared of the above components in the manner as described for Example XIV. This preparation generally comprises a conventional alkyd esterification of the components (A) through (E), to an acid value of 78 at 360–400° F. The alkyd is then cooled to 275° F., whereupon the component (F) is added and the mixture heated to 375° F. to form the half ester with residual acidity, as determined in the manner heretofore described. The modified alkyd was then cooled to 200° F. and (G) added and mixed thoroughly until a homogeneous solution was obtained. The modified alkyd ester analyzed:

NV _____ 70.5%.
Vis. _____ 63.5 stokes.
Gardner color _____ 2–3.
A.V. _____ 88 (on NV).

Part 2

| | Parts by weight |
|---|---|
| (A) Part 1 product | 250 |
| (B) Epoxidized linseed oil (8.5% oxirane) | 61 |
| (C) Dimethylethanol amine | 19.5 |
| (D) Water | 185.5 |

The preparation of the alkyd ester-epoxy complex was made in the same manner as illustrated for Part 2 in Example XIV. The vehicle complex analyzed:

Vis. _____ stokes__ 15
pH _____ 7.6
Gardner color _____ 2
NV _____ percent__ 46

EXAMPLE XVI

In this illustrative example, a preparation of the modified alkyd ester of Example XII was prepared and modified with an epoxidized long chain fatty acid ester. The components forming the Part 2 of the above formulations comprised 250 parts of the base modified alkyd of Example XII, 71 parts epoxidized pentaerythritol-linseed fatty acid ester (8.5% oxirane), 24 parts triethylamine, 197 parts water. This infinitely water dilutable modified alkyd-epoxy ester complex was formulated in the same manner as described in Examples XIV and XV. The vehicle complex analyzed:

Vis. _____ stokes__ 17.5
pH _____ 8.3
Gardner color _____ 2+
NV _____ percent__ 46

This epoxy ester is illustrative of the epoxidized ester compounds of the character as herein embodied, in formulating compositions and products as herein embodied and contemplated.

COMPONENTS OF PART 1

The base oil components incorporated into the alkyd resins are illustrative of saturated and unsaturated long chain fatty acids and esters derived from fatty oils of vegetable, animal and marine origin, containing from 6 to 26 carbon atoms in the fatty chain. The oils used to prepare the alkyd resin may be alcoholyzed preferably in the presence of a catalyst with a poly-functional alcohol before the addition of the dibasic acid usually phthalic anhydride. Alternatively, fatty acids may also be used in the alkyd resin synthesis. Typical, but non-limiting saturated or unsaturated fatty oils are for example cotton seed, corn, rapeseed, soybean, safflower, castor, dehydrated castor, linseed, coconut, menhaden, sardine, whale, cod, tallow, lard and the like. The useful acids for the alkyd resins, generally derived from these oils, comprise caproic, caprylic, capric, lauric, myristic, palmitic, stearic, behenic, oleic, erucic, linoleic, linolenic, arachidonic and clupanodonic. Other acids are tall oil acids and pelargonic. These acids may be modified as with a benzoic acid and the like.

The amount of fatty oil, or fatty acid used in the alkyd can be varied. Generally, the alkyd resin is modified to contain between 10% and 40%, with preferably 20% to 30% of oil.

Trimethylolethane, pentaerythritol, polypentaerythritols, glycol, diethylene glycol, butanediol, glycerol, sorbitol and the like are illustrative of the polyols which may be utilized. The quantities of these polyols used, can vary from a deficiency of about 10% to an excess of about 10% of that chemically equivalent to the combined total acidic components listed in Part 1 of the examples. However, the preferred amount of polyol is that chemically equivalent to the total acidity. Even though excess acidity remains in the finished alkyd ester or resinous material at least the theoretical amount of polyol is preferred to obtain clear water soluble products of half ester formation with the dibasic acid and best results in the gloss and water resistance of cured films.

The dibasic acid component of the alkyd resin can be anyone of those known in the art. However, for economy and improved color retention phthalic anhydride is preferred in the initial esterification of the alkyd. Because a considerable amount of the dibasic acid exists in the form of a diester in the final alkyd, this form is incapable of reacting with the epoxidized oil base material. However, a portion of the phthalic ingredient is believed to occur as the half-ester and accordingly reacts with the epoxidized oil. Its main function is as the resinous component.

The carboxyl groups of the alkyd obtained in Part 1 of the examples function as a solubilizing agent and a coupling agent between the alkyd resin and the epoxidized oil base material. The added dibasic acid compounds reacted with the alkyd are phthalic, hexahydrophthalic, tetrahydrophthalic, monochlorophthalic and chlorendic anhydrides, and the like. They are reacted with the alkyd ester body after the first major portion of the alkyd esterification reaction has been completed. This adduct reacts in the epoxidized compound to form the inter molecular alkyd-epoxy complex. The alkyd modification with these dibasic anhydride materials is preferred to obtain maximum reactivity with epoxidized compounds used in Part 2 of the examples. Thus, the oxirane equivalent of the epoxidized oil base material may be in excess of the free carboxyl groups in the alkyd base.

The water-miscible solvent, as monobutyl ether of ethylene glycol, is also a solvent for the half-ester oil resin compositions, the epoxy oil and the reaction product. This solvent greatly reduces the viscosity of the oil-resin and facilitates manufacture during final neutralization and pigment mixing operations. The solvent also increases water tolerance and aids in maintaining vehicle clarity. Other illustrative water-miscible solvents having a high flash point, are the monomethyl ether and monoethyl ether of ethylene glycol and the monomethyl, monoethyl and monobutyl ethers of di-ethylene glycol. The level of use is not critical but increased quantities tend to give a lower viscosity to the finished vehicles and improve reaction conditions. The preferred level is about 13-15% in final vehicle at 46% NV. Other, and lower flash point water miscible solvents, as denatured alcohol and the like may be used with the temperature of preparation and addition under suitable control.

COMPONENTS OF PART 2

The volatile base amine acts as a stabilizer or inhibitor for the reaction between the half-esters and the epoxy component. The amine is volatile and passes off during baking to allow the residual acidity to react further with the epoxy oil compound. However, while such materials as triethylamine, dimethylethanol amine, and diethylethanol amine, N-methyl morpholine are preferred for clear compositions and produce films having good color retention, other stabilizer inhibitors as ammonia, monoethanol amine, diethanol amine, morpholine, dipropyl amine and diisopropyl amine or the like may be used in some instances. Dimethyl ethanolamine also gives good results. Ammonia and many less volatile amines including caustic and the like neutralizing agents or inhibitors, either tend to discolor the films or do not leave the film properly when baked at a moderate temperature of 200°–300° F. The amount of preferred volatile amine used is the stoichiometric equivalent sufficient to neutralize the vehicle acidity of the alkyd resin epoxy complex.

The epoxidized oils and compounds useful in this invention may be prepared by any of the methods disclosed in the issued patents of Niederhauser, 2,485,160, and Wahlroos, 2,813,878, and as set forth in Riter, Jr., et al., 2,771,472 or Swern, 2,569,502. Preferably the epoxidized compounds are alkali refined before reaction in the processing herein described. Essentially, these oils are those containing unsaturation as mentioned in the base oils for the alkyd resins of Part 1 of the examples. These unsaturated oils and/or their fatty acids may be preliminarily converted to other esters by alcoholysis or esterification with aliphatic and aromatic, saturated and unsaturated, substituted and unsubstituted, mono- and polyhydric alcohols prior or subsequent to epoxidation. In addition, the use of epoxidized long chain fatty esters is also possible, e.g. epoxy-stearyl acetate, epoxy-stearyl epoxy-stearate, butyl epoxy-stearate, octyl epoxy-behenate, methyl di-epoxy-stearate, di-(epoxy-lauryl) adipate, propyl tri-epoxy-stearate, allyl epoxy-stearate, and the like.

Although the epoxy-oils and esters mentioned above, are of animal, vegetable and marine origin, use of epoxidized esters of synthetic and petroleum sources is not excluded.

Broadly defined, the oxirane compounds useful in this invention are essentially substituted and unsubstituted long chain compounds containing between 8 and 26 carbon atoms in the fatty chain portion having at least one internal oxirane group per chain, and with or without an additional oxirane group in the substituted radical.

The preferred oxirane compounds are the epoxidized glyceride oils containing between 5% and 12% oxirane oxygen. In this group, an oil with between 8.0% and 9.5% oxirane is especially preferred. Hence, the base oil for epoxidation should preferably have an iodine value of at least 150. In this class are linseed oil, segregated soybean, safflower, and some fish oils. However, linseed oil is preferred.

The end uses and properties of the final products of this invention are determined by several factors among which are:
(1) Degree of mono-basic acid modification (oil length or modification) of the acidic alkyd resin of Part 1 in the examples;
(2) The weight ratio of the alkyd resin to the epoxidized oil of Part 2 of the examples; and
(3) The oxirane content and structure of the epoxidized oil in Part 2 of the examples.

Film hardness and the overall quality of baked films of the final products increases as the oxirane content of the epoxy oil increases when the amount and type of alkyd resin is held constant. Conversely, hard to soft to plastic to tacky films are possible when the oxirane content diminishes from the preferred oxirane value of 8–9.5% to about 4%. If the oxirane content of the epoxy oil is held constant and the percent oil or mono-basic acid modification of the alkyd resin increases films become softer. Thus, for a given set of desired end properties the weight ratio of the base acidic alkyd ester or resin base to epoxidized oil base component, or the alkyd modification and oxirane content of the epoxy component are all important and interrelated.

As a generalization, films of essentially equivalent properties can be made by combining: 1st, two portions of a short alkyd resin of 20%–25% monobasic acid modification with one portion of an epoxidized linseed oil (8–8.5% or more oxirane); and 2nd, six portions of a longer alkyd resin of 25%–40% monobasic acid modification with one portion of an epoxidized linseed oil (8–8.5% or more oxirane). The above proportions are within the preferred limits to obtain the desired film forming properties of the products herein described. Other ratios outside of those disclosed above will form a wider range of products varying from soft plastics, tacky compositions, to hard friable and brittle products.

These improved vehicles of the present invention of Examples I to XVI inclusive may be utilized as clear baking varnishes, if desired. When so used they provide a very high gloss with good color retention, excellent water and alkali resistance, a high chemical resistance, and very tenacious adhesion, with combined hardness and a high degree of flexibility after baking. Since water is the thinner there is no fire or fume hazard in their application.

The alkyd resin-epoxy complexes are compatible with other water soluble or water dispersible resinous compositions. The film forming characteristics and ultimate film-forming properties can be further varied from hard to soft and from high gloss to matte. Generally less gloss and softness obtains when the components are not entirely mutually compatible.

The following table lists some representative water soluble and dispersible types of resinous materials compatible with the alkyd resin-epoxy complexes of this invention:

| Resin Type | Trade Name | Producer |
| --- | --- | --- |
| Phenol-formaldehyde | Admirez PL-64 | ADM. |
| Silicon type | Silicon R-64 | Union Carbide. |
| Melamine formaldehyde | Cymel 7273-7 | Am. Cy. Co. |
| Butylated melamine formaldehyde | Resimene 881 | Monsanto. |
| | Resimene 882 | |
| | Resimene 883 | |
| Butadiene-styrene | Dow Latex 566 | Dow. |
| Acrylic emulsion | Rhoplex B-85 | Rohm and Haas. |

The following example illustrates a specific composition of the water soluble complexes of the present invention in combination with a preferred water soluble or dispersible melamine-formaldehyde resin.

EXAMPLE XVII

Part 1

Parts by weight
(A) A water soluble alkyd resin-epoxy complex from any of the preceding, Examples I–XII inclusive ------------------------------------------ 100
(B) A water soluble melamine-formaldehyde resin and preferably "Cymel" 7273-7 (75% NV) (American Cyanamid) ------------------------ 5.0

The melamine-formaldehyde resin is simply mixed with the alkyd resin-epoxy complex and may be at a level of about 2 to 10 parts based on the 100 parts of the vehicle. The water soluble melamine resin when added, even in small amounts, aids in viscosity reduction of the solution complex when diluted with water and improves color retention of the cured films. As the weight of melamine resin is increased the film hardness and chemical resistance increase, but the adhesion value and flexibility of the final products decrease. The melamine resin is believed to be reactive on curing with the alkyd resin-epoxy complex.

The above enumerated water-soluble or dispersible compounds may be substituted for the melamine formaldehyde in Example XVII, or otherwise compounded with the soluble epoxy resin complexes to form modified compositions therewith.

The above described water soluble alkyd resin-epoxy complexes can be used as vehicles and formulated directly with a pigment and thinned with water to produce excellent glossy baked enamel finishes. This is illustrated by the following example of a high gloss baking formulation:

EXAMPLE XVIII

| | Parts by weight |
|---|---|
| Titanium dioxide (rutile non-chalking) | 195 |
| Example III vehicle (47% NV) | 472 |
| Water | 333 |
| Pigment volume concentration _____percent__ | 18.5 |
| Vehicle non-volatile _____do____ | 27.6 |
| Krebs units (consistency) | 75-85 |
| Total solids _____percent____ | 41.7 |
| Pigment/binder ratio | 0.9/1.0 |

The titanium dioxide pigment and about one quarter to one third of the Example III vehicle were ground as a paste in a suitable mill, and the balance of the Example III vehicle was then blended in by mixing. The product was then thinned with water. This gave an enamel which cured to a high gloss, hard, tough highly resistant film after baking at 250° F. for 30 min. The 60° Gardner gloss reading was 90.

The film performance is exceptional, compared with all other known water thinned baking type enamels and primers. Further, water clean up, if done immediately, is possible, and there is no fume or fire hazard problems.

This example is illustrative of only one of the many known pigments and coloring agents, of conventional character, which can be compounded with the various modified alkyd resin-epoxy oil base complexes herein described. A preferred pigmented vehicle is to modify a complex of Examples I, II and III in the preferred formulation of Example XIV and then compound a pigmented composition, as illustrated in Example XVIII.

The preferred water soluble vehicles herein provided, show excellent vehicle stability enabling the pigment to be ground directly therein without requiring additional stabilizers or wetting agents, resulting in very simple formulation of enamels and paints. The water soluble solutions readily wet the pigments and reduce the time of compounding to about 25% of the time usually required and permit the addition of from 2 to 4 times the amount of pigment normally added during compounding.

In addition, the vehicles when compounded with iron oxide, silicates, and the like provide excellent primer and the like coatings which adheres to steel and other surfaces, often times difficult to coat. For example, primer coating compositions were compounded, as follows:

EXAMPLE XIX

PRIMER FORMULA

Part 1

| | Percent by weight |
|---|---|
| Metallic brown iron oxide | 5.33 |
| Lithopone | 5.33 |
| China clay | 2.71 |
| Silica | 2.71 |
| Water soluble resin complex (preferred 46% NV) | 15.99 |
| Water | 7.38 |

Part 2

| | |
|---|---|
| Water soluble resin complex (preferred 46% NV) | 31.98 |
| Water | 28.57 |

The components of part 1 are added to a conventional pebble mill and ground for a period of 24 to 40 hours. Thereafter the components of part 2 may be mixed with part 1 by stirring, or addition to the pebble mill. The non-volatile solids may vary. However, for practical working purposes, the range of non-volatiles generally indicated in the formulated complexes is optimum, relative to flow properties in manufacture, handling and for producing pigmented film forming compositions.

As many variations and modifications of this invention as herein set forth may be made without departing from the spirit and scope thereof, the specific embodiments described are given by way of examples illustrative of the invention which is to be limited only by the terms of the appended claims.

I claim:

1. A modified alkyd resin complex comprising the reaction product of (1) about 2 to about 6 parts alkyd resin modified with between 10% and 40% monobasic fatty acid chains of 6 to 26 carbon atoms, said modified alkyd resin having an acid value of about 70 to 120 and (2) about 1 part epoxidized long chain fatty ester (a) containing about 4% to about 12% non-terminal oxirane oxygen formed as 3-member heterogeneous rings with two adjacent carbon atoms within fatty chain portions of 8 to 26 carbon atoms, said epoxidized fatty ester (2) being reacted through the oxirane with the acid portion of the said modified alkyd resin (1) said alkyd and said epoxidized ester constituting the reactants forming said resin complex.

2. The resin product of claim 1, wherein the said monobasic acid chains are fatty acid chains of 8 to 22 carbon atoms.

3. The resin composition of claim 1 including a melamine-formaldehyde resin.

4. The composition of claim 1 including a compatible film forming resin.

5. A water-soluble resinous composition comprising (1) a fatty oil modified alkyd resin (a) containing between 10% and 40% long chain fatty acid chains of 6 to 26 carbon atoms and (b) further modified with a polycarboxylic acid selected from the group consisting of polycarboxylic acids polycarboxylic acid anhydrides and mixtures of the same, said modified alkyd resin being in a partially reacted state having residual carboxyl groups of an acid value of about 40 to 120 and chemically combined through oxygen linkages with (2) a partially reacted long chain epoxidized fatty ester containing residual oxirane oxygen groups, each oxirane group forming a three-member heterogeneous ring with two adjacent carbon atoms within carbon chains, of about 8 to 26 carbon atoms, the combination of said (1) and (2) having an acid value of between about 40 and about 120, a water miscible organic coupling solvent, water, and a volatile neutralizing agent for said residual carboxyl groups temporarily inhibiting further reaction between the unreacted portions of said alkyd and the epoxidized ester compound.

6. The product of claim 5 wherein the oxirane compound is an epoxidized fatty ester with a fatty chain of 8 to 26 carbon atoms and the neutralizing agent is an alkyl amine wherein an alkyl portion contains 1 to 5 carbon atoms.

7. The product of claim 5 wherein the oxirane compound is an epoxidized fatty ester with a fatty chain of 8 to 26 carbon atoms and the neutralizing agent is an alkanolamine wherein the alkanol portion contains 1 to 6 carbon atoms.

8. A water-soluble vehicle for baking finishes comprising (1) about 2 parts to about 6 parts alkyd resins modified with between 10% and 40% fatty acid groups of 6 to 26 carbon atoms in the fatty chain and having an acid value of about 40 to about 120, said alkyd being in a partially reacted state and connected through ester linkages with (2) about 1 part epoxidized long chain fatty esters containing 8 to 26 carbon atoms in its fatty chain having residual oxirane groups, each residual oxirane group forming three-member heterogeneous rings with two adjacent carbon atoms in the carbon chains, (3) a volatile neutralizing agent for neutralizing said acid value and maintaining the said oxirane compound in its partially reacted state and (4) a water-miscible organic solvent.

9. The product of claim 8 wherein, the epoxidized fatty ester comprises epoxidized linseed oil.

10. The product of claim 8 wherein, the epoxidized fatty ester comprises epoxidized soybean oil.

11. The product of claim 8 wherein, the fatty acid groups are derived from fatty oil and the epoxidized ester comprises long chain fatty oil.

12. The product of claim 8 wherein, the fatty groups are derived from fatty oil and the epoxidized ester comprises epoxidized long chain fatty esters of 8 to 22 carbon atoms in the fatty chains.

13. An aqueous coating vehicle containing an intermolecular complex comprising the partial reaction product of (1) about 2 to about 6 parts alkyd resin modified with between 10% and 40% monobasic acid groups of 6 to 26 carbon atoms and having an acid value of about 80 to about 120 and (2) about 1 part epoxidized long chain fatty ester with 8 to 26 carbon atoms on a fatty chain portion having had about 4% to about 12% oxirane oxygen value and a portion of said epoxidized fatty ester (1) being in a reacted state with said modified alkyd resin, said complex being contained in (3) a solvent therefor, (4) a volatile neutralizing agent for the said acidity, and (5) water, said coating vehicle having pH range of about 6.5 to about 9.

14. In the process of preparing a water-dilutable modified alkyd resin complex as a paint and enamel vehicle, the steps comprising (1) preparing a modified alkyd resin by mixing a fatty acid material selected from the group consisting of fatty acids and fatty esters containing 6 to 26 carbon atoms in the fatty chain, a polyhydric alcohol and polycarboxylic acid material selected from the group consisting of polycarboxylic acids, polycarboxylic anhydrides and mixtures of the same, (2) heating to about 350° F. to about 400° F., (3) effecting the production of the modified alkyd with retention of hydroxy groups and carboxylic groups having an acid number of about 70 to 120, (4) cooling the modified alkyd product of reaction, (5) adding a water-miscible organic solvent for said modified alyd, (6) adding about 1 part epoxidized long chain fatty esters (a) having a fatty chain of 8 to 26 carbon atoms and (b) containing about 5% to about 12% oxirane oxygen, to about 2 parts to 6 parts of said modified alkyd, (7) mixing and effecting a partial reaction between the said alkyd and the said epoxidized ester at a temperature of about 125° F. to about 200° F. (8) neutralizing the acid value with a volatile amine before the said reaction is completed and (9) obtaining the modified alkyd resin complex with retention of reactive carboxy and oxirane groups.

15. In the process of claim 14 the steps of partially neutralizing the acid value of the said alkd ester with a portion of the said volatile amine before adding the said epoxidized ester, and effecting a partial reaction with retention of a portion of the said oxirane oxygen.

16. A pigmented composition comprising a water-dilutable solution of (1) about 1 part epoxidized triglyceride oil having oxirane groups within fatty chains of 8 to 26 carbon atoms and partially combined through the oxirane groups with (2) about 2 parts to 6 parts of about 20% to 40% monobasic acid modified alkyd ester containing residual carboxyl acidity of about 40 to about 120, (3) a volatile acid neutralizing agent for said residual acidity to control the reaction between the said epoxidized triglyceride oil and the said modified ester, (4) a water-miscible organic solvent, (5) and inert pigment, and (6) water.

17. A glossy, and alkali resistant pigmented coating composition comprising the reaction product of (1) about 2 parts to about 6 parts water-soluble alkyd resin containing at least about 20% modifying long chain fatty acid molecules of 6 to 26 carbon atoms and having an acidity of about 80 to about 120 and (2) about 1 part epoxidized long chain fatty esters containing 8 to 26 carbon atoms in the fatty chain portions.

18. A resinous product comprising the reaction product of an alkyd (1) having an acid number of about 70 to about 120 and formed from polyhydric alcohol, polycarboxylic acid material selected from the group consisting of polycarboxylic acids, polycarboxylic anhydrides and mixtures of the same, and long chain fatty acid molecules selected from the group consisting of vegetable, animal and marine oils and acid and ester derivatives thereof having 6 to 26 carbon atoms in the fatty chain and (2) epoxidized long chain fatty molecules selected from the group consisting of substituted and unsubstituted vegetable, animal and marine oils, and acid and ester derivatives thereof having from 8 to 26 carbon atoms in the fatty chain and an oxirane value of 5% to 12%, said parts 1 and 2 constituting the major reactants of said resin product.

References Cited by the Examiner

UNITED STATES PATENTS

| 2,556,145 | 6/51 | Niederhauser | 260—18 |
|---|---|---|---|
| 2,591,539 | 4/52 | Greenlee | 260—42 |
| 2,695,895 | 11/54 | Barnard et al. | 260—22 |
| 2,703,765 | 3/55 | Osdal | 260—45.2 |
| 2,720,500 | 10/55 | Cody | 260—22 |
| 2,752,269 | 6/56 | Condo et al. | 260—47 |
| 2,852,477 | 9/58 | Greenlee et al. | 260—22 |
| 2,887,459 | 5/59 | Carmody | 260—22 |
| 2,909,495 | 10/59 | Rosenberg | 260—22 |
| 2,959,559 | 11/60 | Delius | 260—22 |
| 3,086,949 | 4/63 | Chatfield | 260—22 |
| 3,098,052 | 7/63 | Schmitz et al. | 260—22 |

FOREIGN PATENTS

| 737,697 | 9/55 | Great Britain. |
|---|---|---|
| 738,660 | 10/55 | Great Britain. |

OTHER REFERENCES

Payne: "Organic Coating Technology," vol. 1, page 278, pub. John Wiley & Sons, New York.

Jungnickel et al.: "Organic Analysis," vol. 1, New York (1953), pp. 127–132 and 147–149.

LEON J. BERCOVITZ, *Primary Examiner.*

PHILIP MANGAN, ALLEN M. BOETTCHER, ALPHONSO D. SULLIVAN, MILTON STERMAN,
*Examiners.*

UNITED STATES PATENT OFFICE
CERTIFICATE OF CORRECTION

Patent No. 3,196,117                                       July 20, 1965

Robert A. Boller

It is hereby certified that error appears in the above numbered patent requiring correction and that the said Letters Patent should read as corrected below.

Column 1, line 27, strike out "to"; column 3, line 75, for "223.5" read -- 23.5 --; column 5, lines 69 and 75, for "anyhydride", each occurrence, read -- anhydride --; column 6, line 66, for "425" read -- 312 --; column 7, line 57, for "pant" read -- paint --; line 66, for "glyocol" read -- glycol --; column 12, line 42, for "Part 2", in italics, read -- Part 1 --, in italics; column 18, line 48, after "acids" insert a comma; column 19, line 63, for "alkd" read -- alkyd --.

Signed and sealed this 12th day of April 1966.

(SEAL)
Attest:

ERNEST W. SWIDER                                      EDWARD J. BRENNER
Attesting Officer                                              Commissioner of Patents